Figure 1:
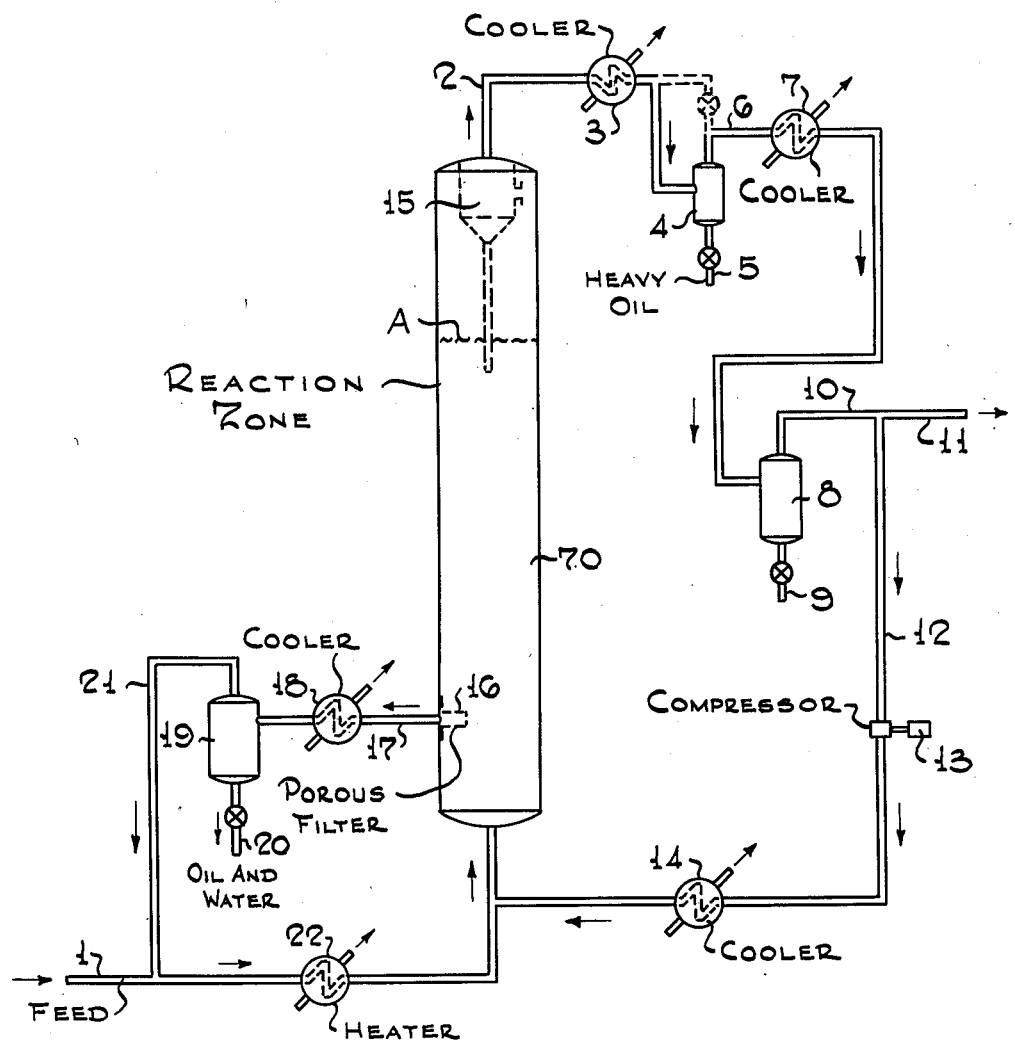

Feb. 19, 1952 J. C. DART 2,586,618
HYDROCARBON SYNTHESIS PROCESS
Filed Nov. 8, 1946 2 SHEETS—SHEET 2

Jack C. Dart Inventor
By [signature] Attorney

Patented Feb. 19, 1952

2,586,618

UNITED STATES PATENT OFFICE 2,586,618

HYDROCARBON SYNTHESIS PROCESS

Jack C. Dart, Baton Rouge, La., assignor to Standard Oil Development Company, a corporation of Delaware Application November 8, 1946, Serial No. 708,627

3 Claims. (Cl. 260—449.6)

1

The present invention relates to hydrocarbon synthesis processes. The invention is more particularly concerned with hydrocarbon synthesis processes wherein the oxidizing nature of the gas in the reaction zone is controlled within desired limits. The invention is particularly directed to an improved method of synthesizing hydrocarbons having more than one carbon atom in the molecule from feed gases comprising carbon monoxide and hydrogen when employing a fluidized bed of a catalyst selected from the group consisting of iron, cobalt and nickel. In accordance with the present invention a portion of the vapors from the lower area of the dense phase catalytic bed is withdrawn. These vapors are cooled to atmospheric temperature under conditions to condense out water. The non-condensed vapors are then returned with the feed gases to the bottom of the reaction zone.

It is well known in the art to conduct hydrocarbon synthesis reactions by contacting hydrogen and oxides of carbon with catalysts under various temperature and pressure conditions. The catalyst employed is usually selected from the iron group metals, as for example, iron, cobalt and nickel. The catalysts are utilized either alone or are employed in conjunction with carriers, such as kieselguhr, diatomaceous earth, synthetic gels, silica, and alumina. Promoters, such as oxides of sodium, potassium, chromium, zinc, aluminum, magnesium, and the rare earth metals are used with the iron group metals. These catalysts are employed in either fixed bed or fluid catalyst operations.

The temperatures employed in the synthesis reaction vary widely, as for example, in the range from about 300° F. to about 800° F. and are generally in the range from about 350° F. to about 750° F. The pressures, likewise, vary considerably and are a function of other operating conditions, such as catalyst employed, activity of the catalysts, character of the feed gases and the temperature utilized. Pressures in the range from about 1 to 100 and higher atmospheres have been suggested. The character of the feed gases introduced into the synthesis reaction zone depends somewhat on the particular temperatures and pressures, and upon the catalyst employed. For example, when employing cobalt type catalyst, it is preferred to use about 1 mol of carbon monoxide to about 2 mols of hydrogen, while when an iron catalyst is utilized, mol ratios from 1/1 to 4/1 of hydrogen and carbon monoxide in the feed synthesis gases are preferred.

The synthesis gases comprising hydrogen and carbon monoxide are produced by various procedures. Methane or natural gas may be oxidized with a reducible metal oxide, with pure oxygen or with gases comprising oxygen. Other feed stocks may comprise coal, shale and other hydrocarbons. The reaction may be conducted in a single or in a plurality of stages. For example, one procedure is to employ a two-stage reforming process using steam and carbon dioxide to oxidize natural gas or methane for the production of carbon monoxide and hydrogen. When employing methane as feed gas and reducing the same with a reducible metal oxide, the reactions are generally conducted at temperatures in the range from about 1400° F. to about 2000° F. When the synthesis gases are produced, by utilizing oxygen and natural gas, the temperatures in the reaction zone are usually in the range from about 2000° F. to about 3000° F.

It has, heretofore, been known in the art to contact gases and solids by passing the gases upwardly through an enlarged treating zone, containing a body of finely divided solids to be contacted, at a controlled velocity to maintain the solids in the treating zone in a quasi-liquid like state. Under properly controlled conditions, the subdivided solid particles are not only maintained in a highly turbulent, quasi-liquid and ebullient state, but there exists a rapid and overall circulation of the fluidized solids throughout the fluid bed.

Processes of this character, wherein fluidized solids are contacted with gases, have a number of inherent and important advantages. For example, intimate contact between the gases and the fluid subdivided solids is secured. It is also possible to maintain a substantially uniform temperature throughout the bed as a result of the extremely rapid transfer of heat from one section of the bed to the other because of the rapid circulation of the fluid subdivided solids. Furthermore, due to the rapid transfer of heat between the solids under these conditions, it is possible to readily add or extract heat from the mass at an extremely rapid rate.

In fluidized operations, the catalyst particles generally comprise particles having particle sizes in the range from about 0 to 200 microns and higher. These particles are maintained in a fluid ebullient state by means of upflowing suspending gases, the velocity of which is in the range from about 0.1 to 5 feet per second and higher.

My invention finds specific application in the synthesis of hydrocarbons. In hydrocarbon synthesis operations of the character described one disadvantage is that the products of reaction, are for example, water and carbon dioxide. As these gases are produced and as hydrogen and carbon monoxide are consumed the gas atmosphere changes from a reducing atmosphere to an oxidizing atmosphere. When the gas is oxidizing, the catalysts such as iron catalysts are oxidized. It is, thus, very desirable to maintain the catalyst in a reduced condition or to greatly reduce the rate of oxidation.

I have now discovered that providing a portion of the vapors are drawn from the lower area of the reaction zone through a porous filter and then cooled to condense out water followed by returning the uncondensed vapors, substantial improvements in the reaction are secured. The uncondensed gases are returned to the reaction zone either alone or in combination with the fresh feed. In this manner a lower concentration of water vapor is secured in the reaction zone. In accordance with a specific adaptation of my process, I also propose to remove carbon dioxide from this portion of the withdrawn vapors. A second advantage of my process is realized by operating with a high superficial velocity in the lower portion of the reactor where a greater part of the reaction undoubtedly occurs. These conditions are more favorable for obtaining high heat transfer coefficients. Thus, lower superficial velocities in the upper portion of the bed results and catalyst entrainment is reduced.

Vapors are removed through porous filter tubes or equivalent means. These means are kept clean by having two or more outlets and blowing back alternately. They are also kept clean by catalyst movement past the surfaces which thus eliminates the necessity of the blow back cycle.

The process of my invention may be readily understood by reference to the attached drawings illustrating embodiments of the same. Figure 1 illustrates an adaptation of my invention wherein a single reaction zone is employed, while Figure 2 illustrates an embodiment of my invention wherein two reaction zones are employed in series.

Referring specifically to Figure 1, synthesis feed gases are introduced into reaction zone 70 by means of feed line 1. The synthesis feed gases comprise carbon monoxide and hydrogen in the desired ratio. Temperature and pressure conditions in reaction zone 70 are likewise regulated to secure the desired synthesis reaction. For the purpose of illustration it is assumed that the temperature in reaction zone 70 is in the range from about 350° F. to 750° F., while the pressure is in the range from about 50 lbs./sq. in. to 700 lbs./sq. in. Also, for the purpose of illustration it is assumed that the catalyst comprises a fluidized iron catalyst, the particles of which have the micron size in the range from about 0 to 200 microns and higher. The upper level of the fluidized bed in zone 70 is maintained at point A. After a sufficient time of contact the reaction vapors are removed overhead from reaction zone 70 by means of line 2, cooled in cooler or equivalent means 3 and passed to separation zone 4. A heavy oil is withdrawn from separation zone 4 by means of line 5 while uncondensed vapors are removed overhead by means of line 6. These overhead vapors are further cooled in cooling or condensing zone 7 and passed to separation zone 8 wherein uncondensed vapors and condensate are separated. The condensate is removed by means of line 9 while the uncondensed vapors are removed by means of line 10. These streams may be handled in any desirable manner. The uncondensed vapors may be withdrawn by means of line 11 or recycled to reaction zone 70 by means of line 12 and compressor 13. The recycled vapors may be heated to any desired degree in heating zone 14. The vapors removed overhead from reaction zone 70 are passed through cyclone separator or equivalent means 15 wherein entrained solid particles are removed from the gases and returned to the fluid bed.

In accordance with my invention I withdraw a side stream from the lower area of the fluidized bed. This side stream is withdrawn through porous filter 16 and line 17. This stream is cooled in cooling or condensing zone 18 and passed to separation zone 19. The condensate comprising water is removed from the system by means of line 20. Uncondensed vapors are removed overhead from zone 19 by means of line 21 and recycled to reaction zone 70 preferably with the feed gases, said vapors may be heated to any desired degree in heating zone 22.

Figure 2:
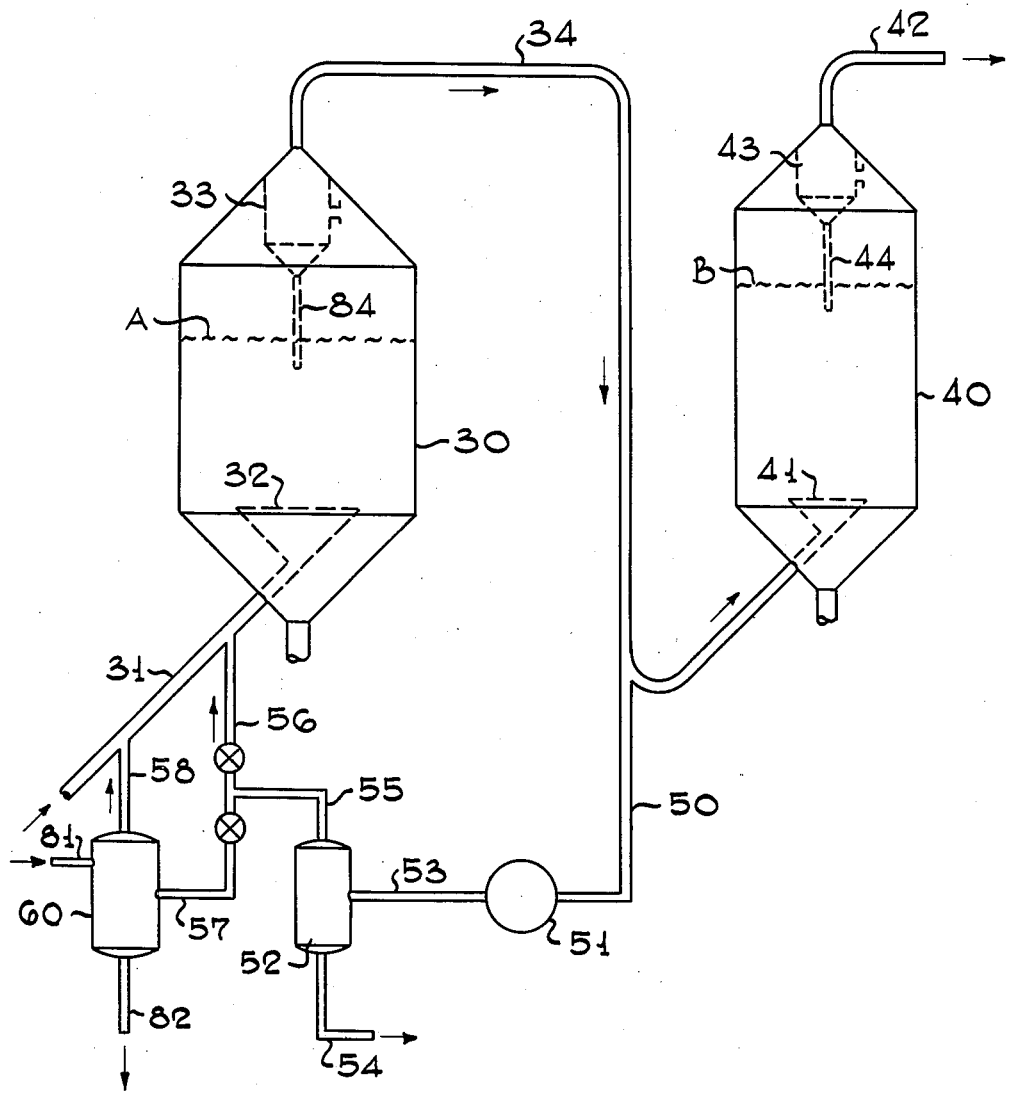

Referring specifically to Figure 2, feed gases comprising carbon monoxide and hydrogen are introduced into reaction zone 30 by means of line 31 and distributing means 32. Reaction zone 30 is operated under synthesis conditions and contains a catalyst comprising a fluidized iron catalyst, the upper level of which is at point A. The reaction vapors are removed from zone 30 through cyclone separator or equivalent means 33 and withdrawn by means of line 34. These vapors are introduced into zone 40 which is similarly maintained under synthesis conditions. Reaction zone 40 likewise contains a fluidized catalyst comprising iron, the upper level of the bed which is at point B. The vapors introduced into zone 40 pass through distributing or equivalent means 41. It is to be understood that provision is made for introducing and withdrawing a fluidized catalyst by any suitable means into zones 30 and 40 respectively. The reaction vapors are withdrawn from zone 40 by means of line 42. These vapors are passed through cyclone separator or equivalent means 43. Entrained solid particles are returned to the catalyst bed in zone 30 by means of line 84 and to the fluidized bed in zone 40 by means of line 44.

In accordance with my invention I segregate a portion of the vapors removed overhead from zone 30 by means of line 34. These vapors are segregated by means of line 50, passed through cooling means 51 and introduced into separation zone 52 by means of line 53. The condensate comprising water is removed from zone 52 by means of line 54 while the uncondensed vapors are removed overhead from zone 52 by means of line 55. Although these vapors may be recycled directly to the bottom of zone 30 by means of line 56, they are preferably passed to carbon dioxide removal zone 60 by means of line 57. The carbon dioxide is removed from the vapors in zone 60 by any suitable means. The vapors may be scrubbed with a solvent to remove the carbon dioxide. The scrubbing medium is introduced into zone 60 by means of line 81 and withdrawn by means of line 82. Vapors free of water and carbon dioxide are removed overhead from zone 60 by means of line 58 and recycled to zone 30 preferably with feed synthesis gases.

As pointed out heretofore, I am able to maintain the catalyst in a reduced condition or at least to greatly reduce the rate of oxidation by my process. This will materially improve the catalyst efficiency and overall activity.

The process of my invention is not to be limited by any theory as to mode of operation, but only in and by the following claims in which it is desired to claim all novelty insofar as the prior art permits.

I claim:

1. In a hydrocarbon synthesis process wherein feed gases comprising carbon monoxide and hydrogen are subjected to synthesis conditions in a synthesis reaction zone in the presence of a catalyst selected from the group consisting of iron, cobalt and nickel, wherein oxidation of the catalyst occurs, the improvement which comprises withdrawing a vaporous stream from said reaction zone at a point intermediate the point of introduction of said feed gases and the point of withdrawal of synthesized hydrocarbons, cooling said vaporous stream in an initial cooling zone to remove water, withdrawing said vaporous stream from said cooling zone and subjecting said vaporous stream to conditions adapted to remove carbon dioxide therefrom and returning said vaporous stream to said reaction zone.

2. Process as defined by claim 1 wherein said catalyst comprises iron.

3. Process as defined by claim 1 wherein the temperature in said reaction zone is maintained in the range from about 350° to 750° F. and wherein said catalyst comprises iron.

JACK C. DART.

REFERENCES CITED

The following references are of record in the file of this patent:

UNITED STATES PATENTS

| Number | Name | Date |
| --- | --- | --- |
| 2,149,515 | Fischer | Mar. 7, 1939 |
| 2,243,869 | Keith, Jr. et al | June 3, 1941 |
| 2,360,787 | Murphree et al | Oct. 17, 1944 |
| 2,417,164 | Huber, Jr. | Mar. 11, 1947 |
| 2,420,558 | Munday | May 13, 1947 |
| 2,429,751 | Gohr et al | Oct. 28, 1947 |
| 2,451,879 | Scharmann | Oct. 19, 1948 |